United States Patent [19]

Mantopoulos et al.

[11] Patent Number: 5,784,571
[45] Date of Patent: Jul. 21, 1998

[54] METHOD FOR REDUCING THE BANDWIDTH REQUIREMENT IN A SYSTEM INCLUDING A VIDEO DECODER AND A VIDEO ENCODER

[75] Inventors: Thierry Mantopoulos, Mountain View; Fabrice Quinard, San Jose; Kevin Grundy, Fremont, all of Calif.

[73] Assignee: Minerva Systems, Inc., San Jose, Calif.

[21] Appl. No.: 572,432

[22] Filed: Dec. 14, 1995

[51] Int. Cl.$^6$ ..................................................... G06F 7/00
[52] U.S. Cl. .................. 395/200.77; 341/60; 364/715.02; 370/477; 370/521; 382/232
[58] Field of Search .................... 395/473, 821, 395/828, 200.77; 348/584, 578, 479, 622, 384; 364/715.011, 715.02; 382/232; 345/202; 341/50; 358/426; 370/477

[56] References Cited

U.S. PATENT DOCUMENTS

| | | |
|---|---|---|
| 5,115,309 | 5/1992 | Hang ........................................ 358/133 |
| 5,351,129 | 9/1994 | Lai ............................................. 348/584 |
| 5,369,617 | 11/1994 | Munson .................................... 365/219 |
| 5,488,695 | 1/1996 | Cutter ........................................ 395/290 |
| 5,586,264 | 12/1996 | Belknap et al. ..................... 395/200.08 |
| 5,598,222 | 1/1997 | Lane .......................................... 348/568 |
| 5,603,058 | 2/1997 | Belknap et al. ......................... 395/855 |

*Primary Examiner*—Emanuel Todd Voeltz
*Assistant Examiner*—Hien Vo
*Attorney, Agent, or Firm*—Skjerven, Morrill, MacPherson, Franklin & Friel; Edward C. Kwok

[57] ABSTRACT

In a video system having an encoder and multiple decoders, a snooping circuit in each decoder compares an address on a common data bus to determine whether encoded video data is read or written by a host computer. When the address on the common data bus is detected to be an address within a predetermined range, the read or write data on the common data bus is latched into a first-in-first-out (FIFO) memory. A decoding circuit in each decoder decodes from the FIFO memory to provide a decoded video data output stream. In this manner, multiple decoders can be supported by the video system without additional bandwidth demand on the host computer.

10 Claims, 3 Drawing Sheets

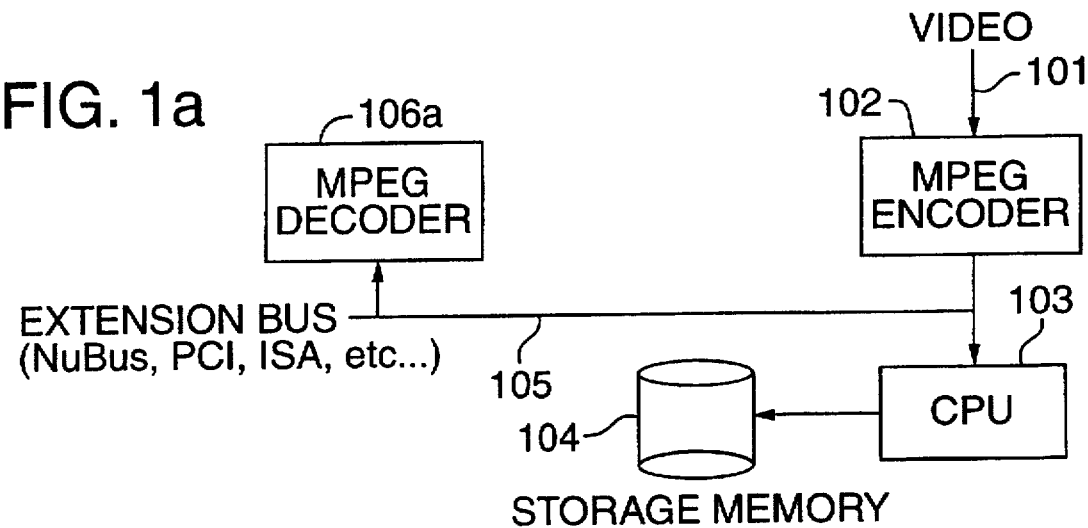
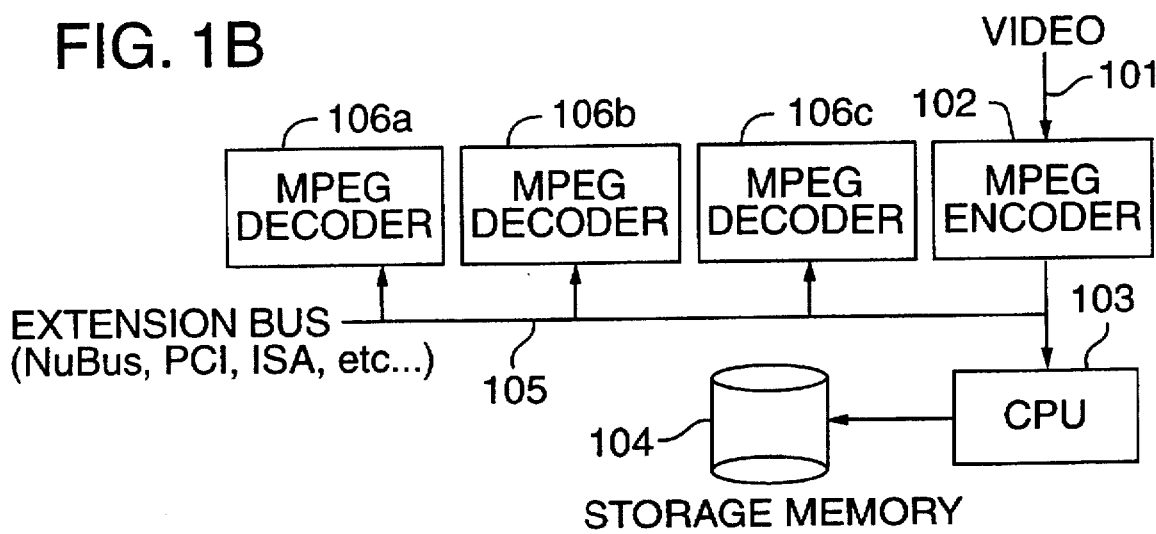
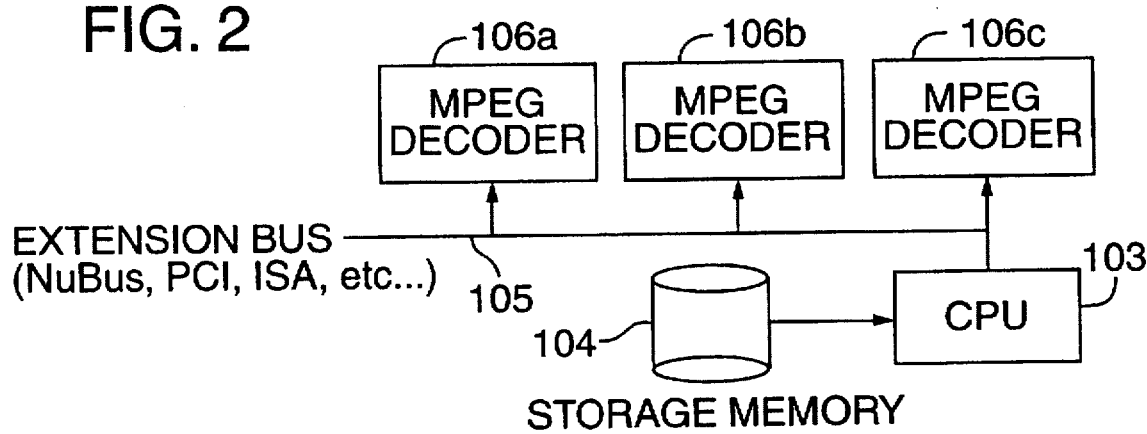

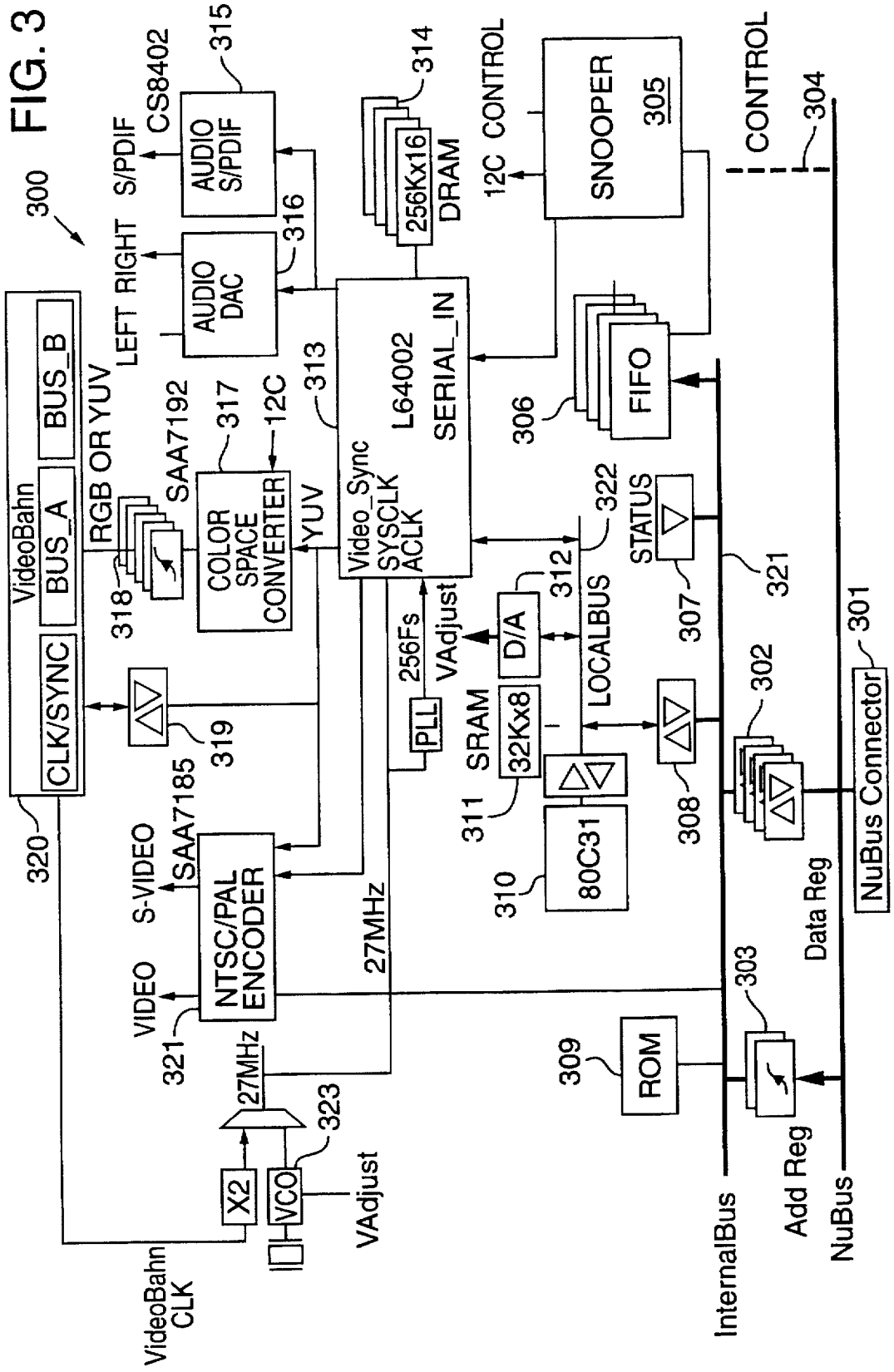

METHOD FOR REDUCING THE BANDWIDTH REQUIREMENT IN A SYSTEM INCLUDING A VIDEO DECODER AND A VIDEO ENCODER

BACKGROUND OF THE INVENTION

1. Field of the Invention

The present invention relates to video processing. In particular, the present invention relates to reducing the bandwidth requirement in a video system which supports one or more decoders simultaneously decoding a common encoded video data stream.

2. Discussion of the Related Art

In any video editing equipment, it is desirable to perform both encoding and decoding of video data simultaneously. Video data encoding is a process which represents an input video signal as a digital data stream. An example of such a digital data stream can be found in any one of the MPEG ("Motion Picture Expert Group") standards. An example of such video editing equipment capable of MPEG encoding and decoding is disclosed in U.S. patent application Ser. No. 08/197,914, filed Feb. 17, 1994, entitled "System and Method for Digital Video Publishing", now U.S. Pat. No. 5,577,191 issued on Nov. 19, 1996, assigned to Minerva Systems, which is also the assignee of the present application. Application Ser. No. 08/197,914 is hereby incorporated by reference in its entirety. In the prior art, a video data signal is encoded under the control of a central processing unit (CPU) of a host computer and is then written into permanent storage. To provide proper visual feedback, the CPU also provides the encoded data stream to a video decoder, which decodes the encoded data stream for further processing, such as being displayed on a video monitor for an operator's inspection. It is desired that a single encoded data stream be decoded for display simultaneously under various output formats or resolutions, or to operators at different monitors. However, under the arrangement of the prior art, for real time operations, the CPU is required to provide the encoded data for each decoder, thereby severely limiting the number of decoders that can be supported by the video editing equipment.

SUMMARY OF THE INVENTION

In accordance with the present invention, a method allows a video system to reduce the bandwidth requirement on a central processing unit (CPU) necessary to support one or more video decoders. In the video system of the present invention, one or more decoders simultaneously decode encoded video data retrieved either from the encoder or a mass storage system. Each decoder includes: (i) an interface to an external bus; (ii) a first-in-first-out (FIFO) memory coupled to the external bus to receive the encoded video data on the data portion of the external bus; (iii) a snooping circuit, which detects whether the address on the address portion of the external bus is an address within a predetermined address range, and which, upon detection of such an address, enables the FIFO memory to latch the associated encoded video data from the external data bus; and (iv) a video data circuit for decoding the encoded video data received in the FIFO memory into a decoded video data stream.

In one embodiment, the video data encoder of the video system is assigned the address in the predetermined address range. The video encoder provides the encoded video data by placing the video data on the external data bus in response to a read request by the host computer. In another embodiment, the host computer retrieves the encoded video data from a mass storage system. In this second embodiment, the host computer places the encoded video data and the address on the external bus in a write operation.

The decoders of the present invention can each provide a different kind of analog or digital video output signal from the decoded video data stream.

In this manner, multiple decoders can be provided in a video system without additional demand on the bandwidth of the host computer's CPU.

The present invention is better understood upon consideration of the detailed description below and the accompanying drawings.

BRIEF DESCRIPTION OF THE DRAWINGS

FIG. 1a shows an example of a video encoding operation in a video system 100, in accordance with the present invention.

FIG. 1b extends system 100 of FIG. 1a to include multiple decoders without additional bandwidth requirement, in accordance with the present invention.

FIG. 2 shows an example of a video decoding operation, in accordance with the present invention.

FIG. 3 shows a video board suitable for implementing MPEG decoders 106a–106c of FIGS. 1 and 2, in accordance with the present invention.

DETAILED DESCRIPTION OF THE PREFERRED EMBODIMENTS

Figure 4:
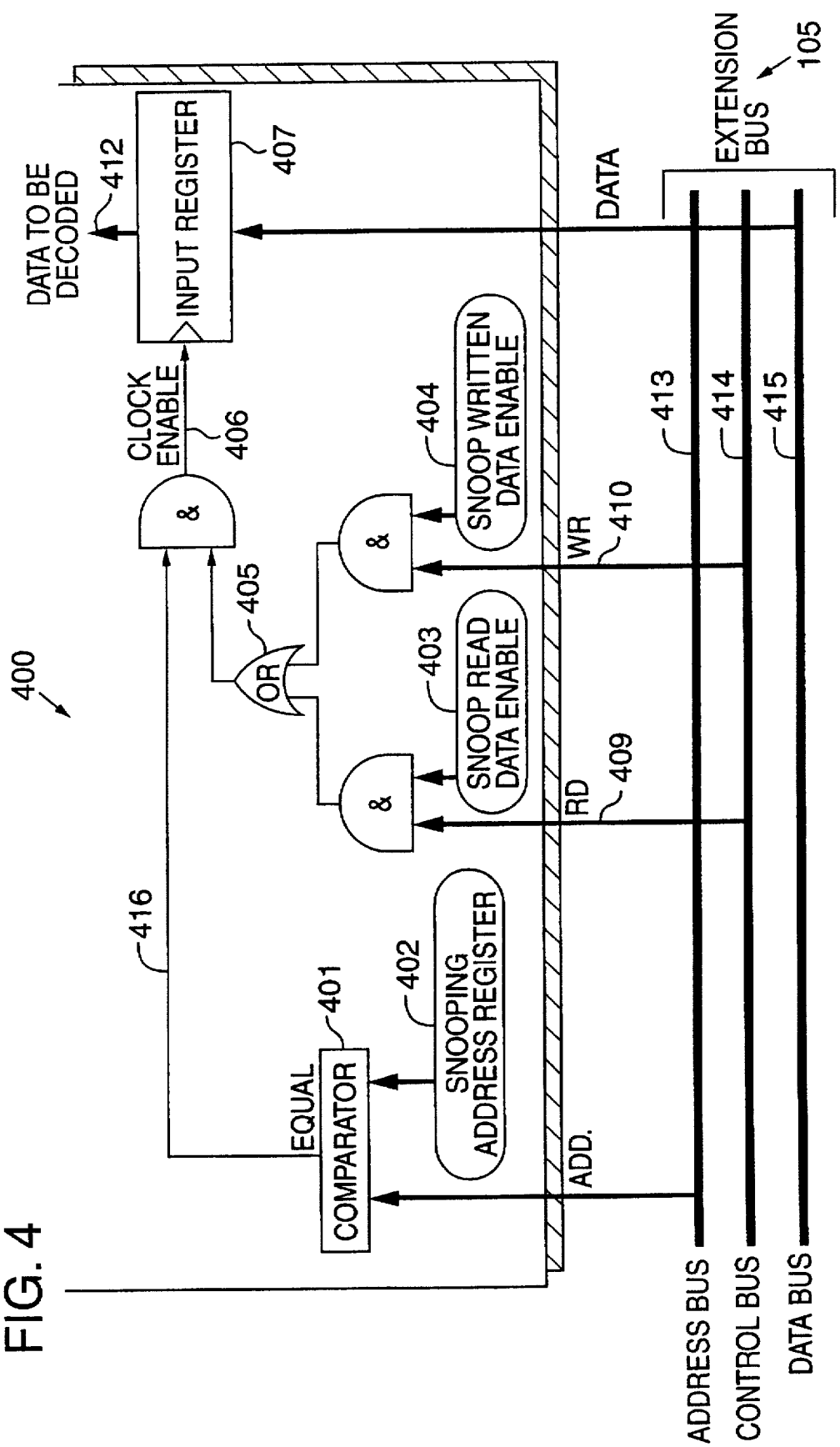
FIG. 4 shows circuit 400 which is used to implement snooper circuit 305 of FIG. 3.

The present invention is applicable to either (i) a video signal encoding operation, in which an encoded video data stream is provided on a common data bus accessible by a number of video decoders, or (ii) a video signal decoding operation, in which multiple decoders read the encoded video data from the common data bus. FIG. 1a shows an example of the video encoding operation of a video system 100, in accordance with the present invention. FIG. 2 shows an example of the video decoding operation.

As shown in FIG. 1a, in video system 100, a video data stream is provided to MPEG encoder 102, which encodes the video data stream in accordance with an aforementioned MPEG standard. A central processing unit (CPU) 103 of a host computer accesses MPEG encoder 102 over common data bus 105 for the encoded video data. CPU 103's access to MPEG encoder 102 can be initiated as a response to an interrupt requested by MPEG encoder 102 or any other suitable mechanism. Common data bus 105 can be any suitable standardized data bus, such as NUBUS[1], or any industry standard bus, such as the ISA bus or the PCI bus. In the present embodiment, common data bus 105 is a NuBus implementation. CPU 105 accesses MPEG encoder 102 by a read operation to an address within the address range $Fp5c__0000 to $Fp5c__FFFF ("encoded data address range"). An address in the encoded data address range triggers a snooping circuit in MPEG decoder 106a, described in further detail below, to latch from common data bus 105 the encoded video data. CPU 103 typically stores the encoded video data read from MPEG encoder 102 into a mass storage device, such as mass storage device 104 shown in FIG. 1a.

[1] NUBUS is a trademark of Apple Computers, Inc.

FIG. 1b extends system 100 to include additional MPEG decoders. As shown in FIG. 1b, system 100 is provided additional video decoders 106b–106c. Since each decoder is provided to "snoop" a predetermined address range and does not require intervention by CPU 103 for its decoding operation, no additional bandwidth is required under the present invention to support multiple video decoders in video system 100.

Alternatively, the present invention is also applicable to a system in which an encoded video data stream is provided simultaneously to a number of video decoders 106a–106c, such as shown in FIG. 2. In FIG. 2, CPU 103 retrieves from mass storage device 104 an encoded video data stream and provides the retrieved encoded video data stream onto common data bus 105 in write operations to addresses within the encoded data address range. In this detailed description, like elements are assigned like reference numerals to simplify the discussion and to facilitate comparison between figures. Thus, for example, common data bus 105 of FIG. 2 is understood to be equivalent to common data bus 105 of FIGS. 1a and 1b. As discussed with respect to FIG. 1a, an address in the encoded data address range triggers decoders 106a–106c to each latch the encoded video data from common data bus 105.

In this embodiment, MPEG encoder 102 can be implemented by any MPEG encoder board, such as that available from Minerva Systems, Inc., Santa Clara, Calif. MPEG decoders 106a–106c can be each implemented by a video board 300 shown in FIG. 3. As shown in FIG. 3, video board 300 interfaces with common data bus 105 through a connector 301. Common data bus 105 has address, data, and control portions, which are coupled by connector 301 to video board 300's address registers 303, data registers 302 and control bus 304, respectively. The contents of address registers 303 and data registers 302 can be placed onto an internal bus 321, which is also coupled by drivers 308 to a local bus 322 of microprocessor 310. A 1-megabyte first-in-first-out (FIFO) memory module is coupled to receive data on internal bus 321. In this embodiment, microprocessor 310 can be implemented by an 80C31 microprocessor, which is a readily available microcontroller. Microprocessor 310 provides housekeeping services to MPEG decoder circuit 313. Such housekeeping services include speeding up or slowing down the system clock signal. The system clock signal received by MPEG decoder circuit 313 is adjusted according to either the amount of encoded data stored in FIFO 306, or the presentation time stamp (PTS) directive embedded in the encoded data stream, so as to avoid an overflow or underflow condition in MPEG decoder circuit 313. Such an adjustment to the system clock is provided in this embodiment through a digital-to-analog (D/A) circuit 312, which controls a voltage-controlled oscillator (VCO) 323. Read-only memory (ROM) 309 and static random access memory (SRAM) 311 provide the code and data memories needed by microprocessor 310.

Decoder 306 receives a serial bit stream of MPEG encoded video data from snooper circuit 305. Snooper circuit 305 examines the address portion of internal bus 321 to detect an address in the encoded data address range. When such an address is detected, the data associated with that address is latched into FIFO 306 from internal bus 321. Snooper circuit 305 then serializes the latched encoded video data and provides it to MPEG decoder circuit 313. As discussed above, encoded data is read from or written into this address range by the host computer during either an encoding operation or a playback operation of the video system.

256K 16-bit words of dynamic random access memory (DRAM), shown in FIG. 3 as DRAM 314, are provided in MPEG decoder circuit 313 for storing decompressed video data. In this embodiment, MPEG decoder circuit 313 can be implemented by a conventional MPEG decoder circuit. Service can be requested by an interrupt to microprocessor 301, or directly on common data bus 105 to the host computer. The present embodiment can provide an analog output video data, encoded in either NTSC/PAL video or S-video format. An audio D/A converter 316 is provided for analog output of the audio portion of the decompressed video stream. Alternatively, the audio portion of the decompressed video data can be also output in digital S/PDIF formats. In addition, MPEG decoder circuit 313 of the present embodiment can also provide the decompressed video data in YUV format. A color space converter 317 is provided to convert, if required, the YUV decompressed video data to RGB representation. The digital decompressed video data can then be provided over a special data bus, VideoBridge 320, to other video processing units of the system. VideoBridge 320, which is also used in the system described in the Copending Application, is a special purpose data bus available from Minerva Systems, Inc. Snooper circuit 305 can be implemented by circuit 400 of FIG. 4. Circuit 400 includes (i) snooping address register 402, which holds the most significant bits of the encoded data address range; (ii) 1-bit snoop read data enable register 403, which enables "snooping" during a video data encoding operation; (iii) 1-bit snoop write data enable register 404, which enables snooping during a video data playback operation; and (iv) an input register 407. During circuit 400's operation, the data on common data bus 105 is coupled to internal data bus 321 by address registers 303, data registers 302 and control bus 304. FIG. 4 represents the values on the address, data and control portions of common data bus 105 by reference numerals 413, 415 and 414 respectively. The address 413 on common data bus 415 is compared with the most significant bits of the encoded video data address range stored in snooping address register 402. If a match is detected, i.e. encoded video data is provided on common data bus 105, control signal 416 is asserted. When either the read (RD) control signal or the write (WR) control signal is asserted on control portion 414 of common data bus 105, as the case may be, the encoded video data in data portion 415 of common data bus 105 is latched into input register 407. Input register 407 is controlled by control signal 406. The content of input register 407 is then forwarded to FIFO 306 shown in FIG. 3. Thus, encoded video data is latched into a decoder circuit without requiring the host computer to provide control. As a result, multiple decoders can be provided at no bandwidth cost to the host computer.

The above detailed description is provided to illustrate the specific embodiments of the present invention and is not intended to be limiting. Numerous variations and modifications within the scope of the present invention are possible. The present invention is defined by the appended claims.

We claim:

1. A video system including one or more decoders for decoding encoded video data, each decoder comprising:

an interface to an external bus having an address portion and a data portion;

a memory unit coupled to said external bus for receiving said encoded video data on said data portion of said external bus, said memory unit receiving said encoded video data when an asserted enable signal is received;

a snooping circuit coupled to receive an address on said address portion of said external bus, said snooping circuit providing said asserted enable signal when said address is an address within a predetermined address range; and a video data circuit for decoding said encoded video data received in said memory unit into a decoded video data stream.

2. A video system as in claim 1, further comprising:

a video data encoder, being assigned said address in said predetermined address range, for encoding a video data stream to provide said encoded video data; and a host computer for controlling said video system, said host computer causing said encoded video data to be placed on said data portion of said external bus in a read operation of said external bus effectuated by placing said address on said address portion of said external bus.

3. A video system as in claim 1, wherein each decoder further comprising:

a mass storage system for storing said encoded video data; and a host computer for controlling said video system, said host computer retrieving said encoded video data from said mass storage system and causing, in a write operation on said external bus, said encoded video data and said address to be placed on said data portion of said external bus and said address portion of said external bus, respectively.

4. A video system as in claim 1, wherein each decoder further comprises an analog video output circuit for providing an analog output signal from said decoded video data stream.

5. A video system as in claim 1, wherein said memory unit comprises a first-in-first-out (FIFO) memory.

6. A method for providing one or more decoders to decode video data, said method comprising, in each decoder, the steps of:

interfacing said decoder to an external bus, said external bus having an address portion and a data portion;

coupling a memory unit to receive from said external bus said encoded video data on said data portion of said external bus, said memory unit receiving said encoded video data when an asserted enable signal is received;

comparing an address on said address portion of said external bus with selected bits of a stored address within a predetermined address range, said snooping circuit comparison confirms that said address is within said predetermined address range; and decoding said encoded video data received in said memory unit into a decoded video data stream.

7. A method as in claim 6, further comprising the steps of:

assigning a video encoder said address in said predetermined address range, said video encoder encoding a video data stream to provide said encoded video data; and providing a host computer to control said video system, said host computer causing said encoded video data to be placed on said data portion of said external bus in a read operation of said external bus effectuated by placing said address on said address portion of said external bus.

8. A method as in claim 6, wherein each decoder further comprising:

storing said encoded video data in a mass storage system; and providing a host computer to control said video system, said host computer retrieving said encoded video data from said mass storage system and causing, in a write operation on said external bus, said encoded video data and said address to be placed on said data portion of said external bus and said address portion of said external bus, respectively.

9. A method as in claim 6, further comprising the step of providing said decoded video data stream as an analog video output signal.

10. A method as in claim 6, wherein said memory unit comprises a first-in-first-out (FIFO) memory.

* * * * *